United States Patent
Kinnear, Jr. et al.

(10) Patent No.: US 12,150,231 B2
(45) Date of Patent: Nov. 19, 2024

(54) STORED ENERGY DISCHARGE TOOL FOR COMPONENT PROTECTION

(71) Applicant: International Business Machines Corporation, Armonk, NY (US)

(72) Inventors: John Thomas Kinnear, Jr., LaGrangeville, NY (US); John S. Werner, Fishkill, NY (US); Rebeccah J. Vossberg, Rochester, MN (US); Justin Christopher Rogers, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 17/929,851

(22) Filed: Sep. 6, 2022

(65) Prior Publication Data
US 2024/0080960 A1     Mar. 7, 2024

(51) Int. Cl.
*H05F 3/04*     (2006.01)
*G06F 1/18*     (2006.01)

(52) U.S. Cl.
CPC ............... *H05F 3/04* (2013.01); *G06F 1/189* (2013.01)

(58) Field of Classification Search
CPC ..... H05F 3/04; H05F 3/00; H05F 3/02; G06F 1/189; G06F 1/18; H02H 9/00; H01R 13/648; H01R 13/6485
USPC ........................................... 361/56, 212, 220
See application file for complete search history.

(56) References Cited

U.S. PATENT DOCUMENTS

| | | | |
|---|---|---|---|
| 5,164,880 A | 11/1992 | Cronin | |
| 5,398,154 A | 3/1995 | Perkins | |
| 5,708,552 A | 1/1998 | Han | |
| 5,734,608 A | 3/1998 | Ferris | |
| 6,804,119 B2 | 10/2004 | Ziemkowski et al. | |
| 6,955,551 B2 | 10/2005 | Yamamoto | |
| 7,082,676 B2 | 8/2006 | Ramirez | |
| 8,975,909 B1 | 3/2015 | Cortez | |
| 2005/0122645 A1 | 6/2005 | Ker | |

(Continued)

FOREIGN PATENT DOCUMENTS

| | | |
|---|---|---|
| JP | 11201997 A | 7/1999 |
| JP | 2004071565 A | 3/2004 |

(Continued)

OTHER PUBLICATIONS

Hubing T. H., "Electrostatic Discharge Protection for Card-edge Connectors", republished Jan. 31, 2005, originally published Dec. 1, 1989, IPCOM000038190D, <retrieved from the Internet Jun. 4, 2022 at 12:18 PM> https://priorart.ip.com/IPCOM/000038190.

(Continued)

*Primary Examiner* — Danny Nguyen
(74) *Attorney, Agent, or Firm* — Kimberly Zillig

(57) ABSTRACT

A stored energy discharge apparatus for discharging electrical charge from a first component prior to being installed into a second component. The apparatus includes at least one mounting component adapted to a desired voltage potential used in the second component, and at least one discharge component adapted to receive the first component and discharge electrical charge from the first component to the second component through the at least one mounting component prior to the first component being installed in the second component.

17 Claims, 4 Drawing Sheets

(56) References Cited

U.S. PATENT DOCUMENTS

2009/0290274 A1   11/2009  Suenaga
2011/0237095 A1*  9/2011  Pipho .................. H05K 1/0259
                                                                        439/55

FOREIGN PATENT DOCUMENTS

JP        2010003290 A    1/2010
KR         0169840 B1    4/1999

OTHER PUBLICATIONS

Sparkpen Battery Capacitor Fast Discharge Pen—Voltage Display Discharger Protection Electrician Voltage Discharging Tool for Electronic. TKDMR. Amazon. https://www.amazon.com/Sparkpen-Battery-Capacitor-Fast- Discharge/dp/B07ZYVVYJF/ref=sr_1_2?keywords=capacitor+discharge+tool&qid=1644070075&sr=8-2. Retrieved on Jun. 13, 2022.

* cited by examiner

STORED ENERGY DISCHARGE TOOL FOR COMPONENT PROTECTION

BACKGROUND

The present disclosure relates generally to circuits and method for electrostatic discharge (ESD) protection, and more particularly to a stored energy discharge apparatus for discharging electrical charge from a first component prior to being installed into a second component.

In an electrical system, electrical charge can build up on a component that plugs into another component. Built-up energy presents a concern where an ESD event can cause damage to sensitive components.

SUMMARY

According to some embodiments of the disclosure, there is provided a stored energy discharge apparatus for discharging electrical charge from a first component prior to being installed into a second component. The apparatus includes at least one mounting component adapted to a desired voltage potential used in the second component, and at least one discharge component adapted to receive the first component and discharge electrical charge from the first component to the second component through the at least one mounting component prior to the first component being installed in the second component.

According to some embodiments of the disclosure, there is provided a system. The system includes a first component, a second component, wherein the second component is adapted to allow the first component to be installed therein at a final location, and a stored energy discharge apparatus adapted to discharge electrical charge from the first component prior to being installed into the final location in the second component. The apparatus includes at least one mounting component adapted to a desired voltage potential used in the second component, and at least one discharge component adapted to receive the first component and discharge electrical charge from the first component to the second component through the at least one mounting component prior to the first component being installed in the second component.

According to some embodiments of the disclosure, there is provided a method for using a stored energy discharge apparatus for discharging a first component prior to being installed into a second component. The method includes providing the stored energy discharge apparatus. The method further includes electrically connecting the stored energy discharge apparatus to a desired voltage potential used in the second component. The method also includes providing the first component, and contacting the first component with the stored energy discharge apparatus and discharging electrical charge from the first component.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
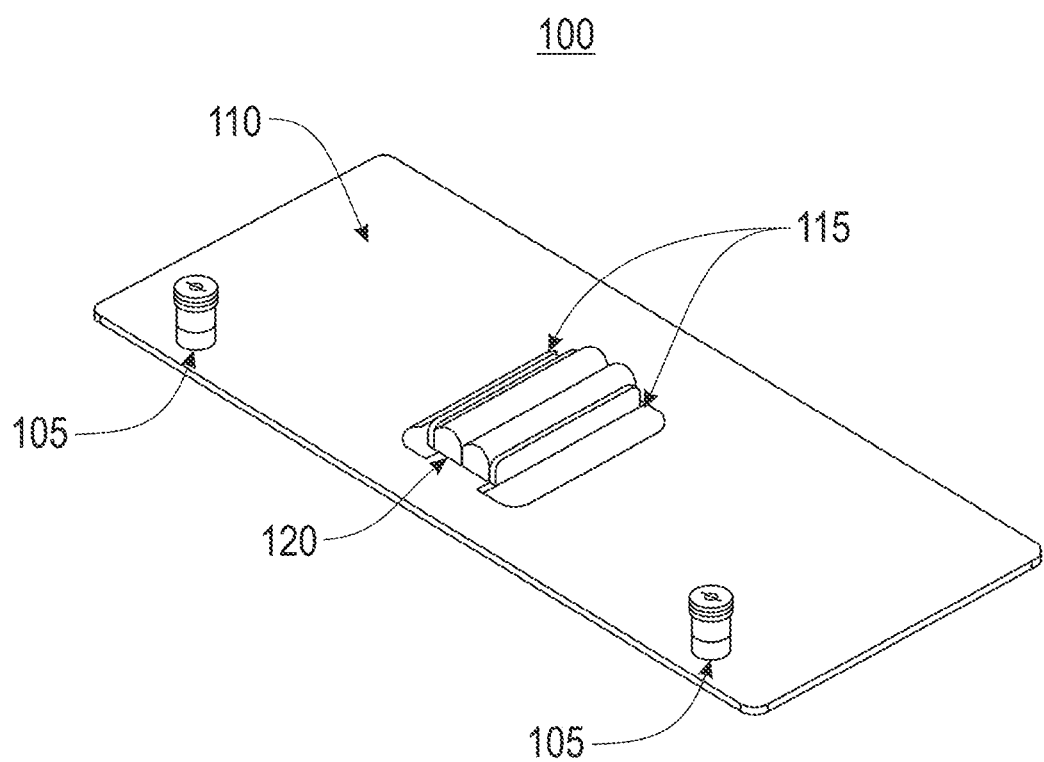
FIG. 1 is a schematic, perspective view of an electrostatic discharge (ESD) tool apparatus, in accordance with an illustrative embodiment of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to circuits and methods for electrostatic discharge (ESD) protection, and more particularly to a stored energy discharge apparatus (i.e., an ESD tool apparatus) for discharging electrical charge from a first component prior to being installed into a second component. While the present disclosure is not necessarily limited to such applications, various aspects of the disclosure can be appreciated through a discussion of various examples using this context.

In an electrical system, such as a computer system, electrical charge can build up on a component that plugs into another component. For example, electrical charge can build up on a memory component prior to plugging the memory component into a computer server. Built-up energy, such as an electrical charge, can build up at an output of a differential dual in-line memory module (DDIMM), for example. When the DDIMM is plugged into a server or a processor drawer, for example, a connection can be made between a signal pin on the DDIMM and the processor. A significant amount of energy can discharge down the signal pin and can cause damage to the processor. Normal handling and use of a ground strap may not discharge the DDIMM to a safe level, which requires the DDIMM to be discharged just before it is plugged into the server of processor drawer.

One feature or advantage of the disclosed apparatuses and methods is that a tool can be provided in order to discharge electrical charge from a first component prior to plugging the first component into a second component. A further feature or advantage is that the disclosed tool can be used across brands of servers in order to discharge DDIMMs, for example, prior to plugging the DDIMMs into servers. Yet another feature or advantage is that the tool can be grounded to a server, for example, prior to a connector (e.g., a contact pin or a signal pin) on an insertable component being inserted into a discharge mechanism of the server. In addition, the tool can be easily detectable since it is used in the field when plugging components into a server, for example, where ESD damage can be a concern.

Embodiments described in the disclosure provide an apparatus for discharging a first component (e.g., a memory dual in-line memory module (DIMM)) prior to plugging the first component into a second component (e.g., a server). The apparatus can be comprised of a grounding and mounting means, a working surface, bracing brackets, and a discharge mechanism. A method is also disclosed for use of the apparatus, in which the apparatus allows electrical charge on a first component to be discharged prior to installation of the first component in a second component.

Although the term "ground" or "grounding" is used throughout the specification, other embodiments may operate at different voltage potentials where the stored energy discharge tool should be attached to said voltage potential. This ensures that after use, the first component will be at a desired voltage potential when plugged into the second component.

Turning to the figures, FIG. 1 depicts an ESD tool apparatus (i.e., stored energy discharge apparatus) 100, consistent with some embodiments. The ESD tool apparatus 100 can be used to discharge a first component (e.g., a memory DIMM) (not shown) prior to plugging into a second component (e.g., a server) (not shown). The ESD tool apparatus 100 can include one or more grounding and mounting components 105 (two (2) shown), a working surface 110, two (2) bracing brackets 115, and a discharge component 120. FIG. 1 shows only one embodiment, with other suitable configurations also being contemplated by the disclosure, which can be tailored for many different system configurations and component connectors. In addition, although the ESD tool apparatus 100 is shown as a separate tool that can be attached to a second component (e.g., a server), In alternative embodiments, however, the ESD tool apparatus 100 can be permanently fixed within, or part of, the second component. In other embodiments, the ESD tool apparatus 100 can be electrically connected to the second component using an electrical conductor (e.g., wire, conductive metal server rack rails, etc.).

The grounding and mounting component(s) 105 can be utilized to mount the ESD tool apparatus 100 to a location inside a second component (e.g., a server) near a first component (e.g., a memory DIMM) plug-in location. In alternative embodiments, grounding and mounting component(s) 105 can be used outside of the second component (e.g., attached via a wire, mounted to the outside of second component, connected to the server rack or server rack rails, which are conductive metal at the same ground potential used within the second component, etc.). The grounding and mounting component(s) 105 can also electrically ground the ESD tool apparatus 100 to the second component (e.g., a server). As shown in FIG. 1, the grounding and mounting components 105 can be one or more (with two (2) being shown in FIG. 1) electrically conductive screws, for example. In alternative embodiments, the grounding and mounting components 105 can be, e.g., electromagnetic compatibility/electromagnetic interference (EMC/EMI) gaskets, electrically conductive screws, electrically conductive bolts, electrically conductive pegs, electrically conductive dowels, electrically conductive connector ground pins, and electrically conductive tape, for example. In further alternative embodiments, founding and mounting components 105 can be a connector that only connects ground pins to the printed circuit board (PCB) ground (i.e., no power or signal pins are connected when the ESD tool apparatus 100 is inserted into the connector). The grounding and mounting components 105 can be made of any conductive material, such as a metallic material, for example. Alternatively, or additionally, the grounding and mounting components 105 can be made of any material that connects the discharge component 120 to ground with a resistance of less than about $1 \times 10^9$ ohms. In some embodiments, each of the grounding and mounting components 105 can includes a plurality of components. An example of one embodiment of a grounding and mounting component can include pegs and dowels that can be used for mounting the ESD tool apparatus 100. In addition, the same grounding and mounting component can include an electromagnetic interference (EMI) gasket between the ESD tool apparatus 100, and a grounded portion of the second component (e.g., a server) can be used for grounding.

The working surface 110 of the ESD tool apparatus 100 can provide a flat or nearly flat, grounded surface for users to discharge one or more first components (e.g., a memory DIMS). The working surface 100 can provide an electrically connected portion between the grounding and mounting components 105 and the bracing brackets 115 or discharge component(s) 120. The working surface 110 can be made of a conductive material, such as a metallic material, for example. Other suitable conductive materials or static dissipative materials are contemplated, however. Alternatively, the working surface 110 can be made of a material that is not electrically conductive. Instead, an alternative grounding pathway can be provided between the grounding and mounting components 105 and the discharge component 120 (e.g., a wire).

The bracing brackets 115 shown in FIG. 1 are an example connection between the working surface 110 and the discharge component 120, and support of the discharge component 120. The bracing brackets 115 can help to ensure that the discharge component 120 can apply a desired compression/force to a connector of the first component (e.g., a memory DIMM), for example, to ensure that any electrical charge built up on the first component is discharged by the discharge component 120. The bracing brackets 115 can be made of a conductive material (e.g., a metal) such that there is a ground path through the working surface 10 to the grounding and mounting means 105 and the second component (e.g., a server). The bracing brackets 115 can be any suitable configuration and can be other than a bracket, for example. In some embodiments, bracing brackets 115 may not be used (e.g., for different connector styles, discharge component 120 may be an EMC/EMI gasket that lays flat on working surface 110). In alternative embodiments, the bracing brackets 115 may not be grounded, but instead an alternative grounding path can be provided from the discharge component 120 to the second component (e.g., a server).

The discharge component 120 can be attached to the bracing brackets 115, or other bracing components, and can form a slot or opening that a connector of the first component (e.g., a memory DIMM) can be inserted into for discharge of electrical charge. The discharge component 120 can be made of any material that has a surface resistance of less than $1 \times 10^9$ ohms would be sufficient. In one embodiment, the discharge component 120 can be made of fabric covering foam EMC/EMI gaskets that are compressed upon insertion of the first component. In preferred embodiments where EMC/EMI gaskets are used, bracing brackets 115 ensure gasket compression between 30% and 70% when the connector of the first component is inserted. In another embodiment, the discharge component 120 can be another suitable device capable of discharging the first component (e.g., EMC springs, clips etc.). The discharge component can include, for example, a fabric-covered foam gasket, a fabric-covered electromagnetic compatibility spring and a fabric-covered grounding clip. In alternate embodiments, discharge component 120 may lay flat on working surface 110 for use with different first component connector types that may be part of voltage regulator modules (VRMs), power supply units (PSUs), fan assemblies, input/output (I/O) cards, storage drives (e.g., SSD, HDD, NVMe), cassettes, etc.

In alternate embodiments, the ESD tool apparatus 100 can include multiple types of discharge components 120 on one working surface 110 (e.g., the ESD tool apparats 100 can contain one discharge component 120 exactly as shown in FIG. 1 for DIMMs and a second discharge component (not shown) that is a flat EMC/EMI gasket used for VRM connectors, both on the same working surface 110.

Figure 2:
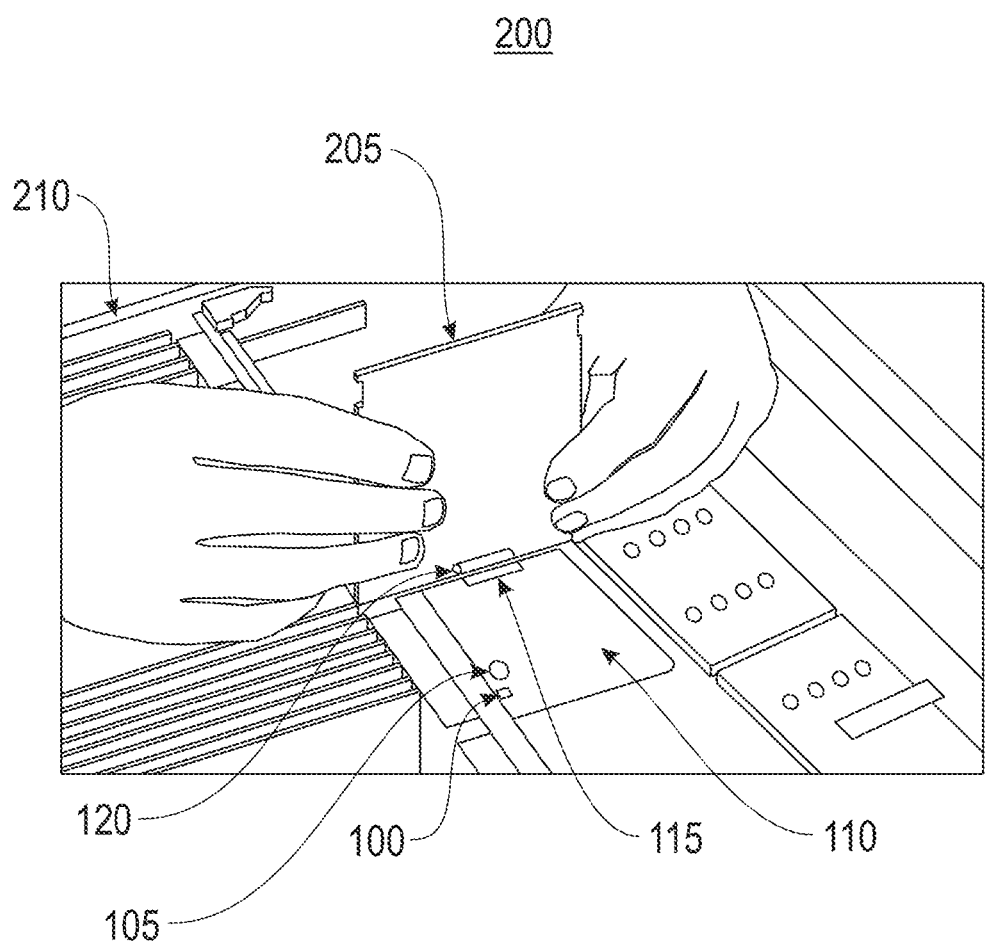
FIG. 2 is a schematic view of an environment with a first component being inserted by a human's hands into the ESD tool apparatus of FIG. 1 that is shown mounted to a portion of a second component, in accordance with an illustrative embodiment of the disclosure.

FIG. 2 depicts a schematic view of an environment 200 with a first component 205 (e.g., a memory DIMM) shown being inserted by a human's hands into the ESD tool apparatus 100 (of FIG. 1) that is shown attached or connected to a mounting position within a portion of a second component 210 (e.g., a server). In particular, a portion (e.g., a connector) of the first component 205 is shown inserted into the discharge component 120 of the ESD tool apparatus 100. Any electrical charge on the first component 205 can be provided a path to ground by such contact. If all electrical charge on the first component is removed, then there can be no energy left that could discharge into the second component 210 once it is installed (or plugged) into a final, desired position, such as a memory slot, for example (not shown). As a result of discharging electrical charge on the first component 205 immediately before installing into the second component 210, potential damage to sensitive components, such as processors, integrated circuit (ICs), etc. in the second component 210 can be reduced or averted.

Figure 3:
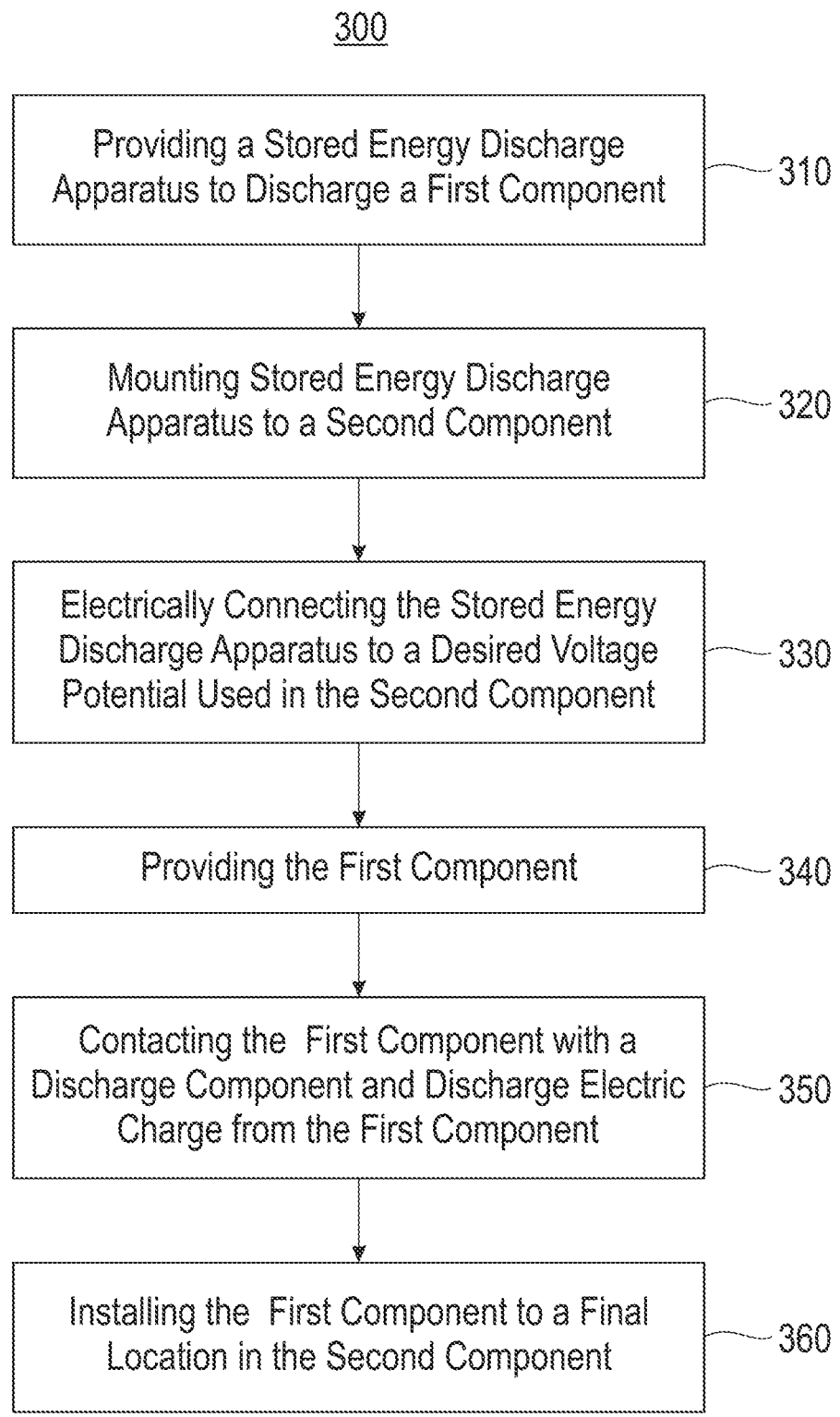
FIG. 3 is a flow chart of a method of using an ESD tool apparatus to discharge electrical charge of a first component prior to installing the first component into a second component, in accordance with an illustrative embodiment of the disclosure.

FIG. 3 is a flowchart of a method 300 of using the ESD tool apparatus 100 (i.e., stored energy discharge apparatus) to discharge electrical charge of a first component prior to installing the first component 205 into a second component 210. An operation 310 of the method is providing a stored energy discharge apparatus. The stored energy discharge apparatus 100 (see FIGS. 1 and 2) can include a working surface 110, at least one grounding and mounting component 105 connected to the working surface 110 and adapted to ground the working surface 110 to the second component 210, and at least one discharge component 120 electrically connected to the working surface 110 and adapted to receive the first component 205 and discharge electrical charge from the first component 205 to the second component 210 through the at least one grounding and mounting component 105. The method can further optionally include an operation 320 of mounting to a grounded point within the stored energy discharge apparatus 100 to the second component 210 or another point outside of the second component 210 that is at the same ground potential as the second component 210. Instead of mounting the stored energy discharge apparatus 100 to the second component 210, the stored energy discharge apparatus 100 can be hand-held as long as the store energy discharge apparatus 100 is connected to ground. Also, an operation 330 of grounding the stored energy discharge apparatus 100 to the second component 210 is shown. In some embodiments, operation 320 involves electrically connecting the stored energy discharge apparatus 100 to a desired voltage potential used in the second component 210. In other embodiments, the action to ground stored energy discharge apparatus 100 can include connecting a wire between a ground potential within or matching that of the second component 210 using a wire or another conductive connection method. As further shown in FIG. 3, operation 340 is providing the first component 205. Another operation 350 is contacting the first component 205 with the at least one discharge component 120 and discharging electrical charge from the first component 205. Operation 360 is installing the first component 205 to a final, desired location (not shown) in the second component 210. The first component 205, for example, can be a memory component, and the second component 210, for example, can be a computer server.

Figure 4:
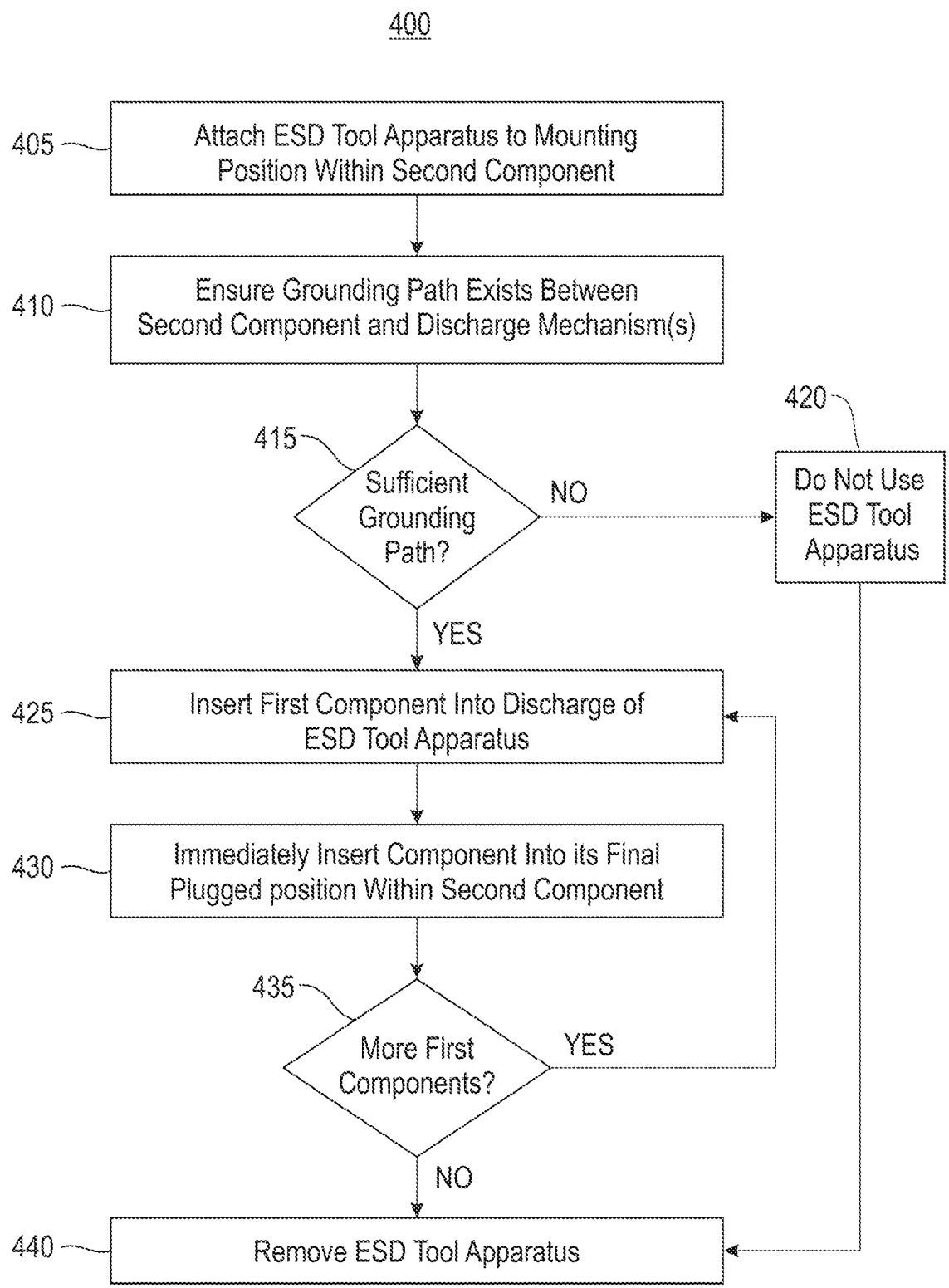
FIG. 4 is a flow chart of a method of using an ESD tool apparatus to discharge electrical charge of a first component prior to installing the first component into a second component, in accordance with an illustrative embodiment of the disclosure.

FIG. 4 is a method 400 of using the ESD tool apparatus 100 (as in FIGS. 1-2) to discharge electrical charge of a first component 205 prior to installing the first component 205 into a second component 210 (e.g., a server). A user can attach the ESD tool apparatus 100 to a mounting position within the second component 210 (operation 405). In alternate embodiments, the ESD tool apparatus 100 can be mounted outside of the second component 210. Another operation 410 is to ensure a grounding path exists, or is found, between the second component 210 and the discharge component 120 of the ESD tool apparatus 100. The grounding path can be between a chassis of the second component 210 and the discharge component 120. This operation can be done using a digital multimeter (DMM), for example. A decision can be made, at operation 415, as to whether a sufficient grounding path exists or is found. If a sufficient grounding path does not exist, as at operation 420, then the ESD tool apparatus 100 is not used, and can be removed from the second component 210 (operation 440). If a sufficient grounding path does exist, then the first component 205 can be inserted into the discharge component 120 of the ESD tool apparatus 100 (operation 425), and any electrical charge can be discharged. A portion of the first component 205 that can be inserted into the discharge component 120 can be a connector located on the first component 205, for example. Immediately after the electrical charge is discharged from the first component 205, the first component 205 can then be inserted into a final (or plug-in) position within the second component 210 (operation 430). If there are more first components 205 (operation 435) to be discharged, then each additional first component 205 can be inserted into the discharge component 120 of the ESD tool apparatus 100 (operation 425), and after discharge can then be inserted into the second component 210 (operation 430). If there are no more first components 205 (operation 435), then the ESD tool apparatus 100 can be removed from the second component 210 (operation 440).

Some additional operations can be performed with regard to the method of FIG. 4. For example, the user can perform a further investigation to ensure that there is no damage to the ESD tool apparatus 100 or to the second component that could impact the grounding path. Yet another possible operation is that the user can replace the ESD tool apparatus 100 that has a grounding issue, for example, with another ESD tool apparatus 100. Other possible operations include grounding ESD tool apparatus 100 in another way than was initially tried (e.g., using a wire instead of screwing the tool to the chassis of the second component) or mounting ESD tool apparatus 100 to another location within or outside of the second component that is at the same ground potential.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A stored energy discharge apparatus for discharging electrical charge from a first component prior to being installed into a second component, the apparatus comprising:
   at least one mounting component adapted to a desired voltage potential used in the second component;
   at least one discharge component adapted to receive the first component and discharge electrical charge from the first component to the second component through the at least one mounting component prior to the first component being installed in the second component; and
   at least one bracing component adapted to attach and electrically connect the at least one discharge component to a working surface,
   wherein the at least one bracing component is adapted to allow the at least one discharge component to be compressed against the first component when the first component is received by the at least one discharge component.

2. The apparatus of claim 1, wherein the desired voltage potential is a ground potential of the second component.

3. The apparatus of claim 1, further comprising:
   the working surface that electrically connects the at least one discharge component to the at least one mounting component.

4. The apparatus of claim 3, wherein the at least one mounting component is adapted to mount the working surface to the second component.

5. The apparatus of claim 1, wherein the at least one mounting component is selected from a group consisting of an electrically conductive screw, an electrically conductive bolt, an electrically conductive peg, an electrically conductive dowel, an electrically conductive connector ground pin, and electrically conductive tape.

6. The apparatus of claim 1, wherein the at least one discharge component is selected from a group consisting of a fabric-covered foam gasket, a fabric-covered electromagnetic compatibility spring and a fabric-covered grounding clip.

7. The apparatus of claim 1, wherein the first component is a memory component, and the second component is a computer server.

8. A system comprising:
   a first component;
   a second component, wherein the second component is adapted to allow the first component to be installed therein at a final location; and
   a stored energy discharge apparatus adapted to discharge electrical charge from the first component prior to being installed into the final location in the second component, the apparatus including:
      at least one mounting component adapted to a desired voltage potential used in the second component;
      at least one discharge component adapted to receive the first component and discharge electrical charge from the first component to the second component through the at least one mounting component prior to the first component being installed in the second component; and
      at least one bracing component adapted to attach and electrically connect the at least one discharge component to a working surface,
      wherein the at least one bracing component is adapted to allow the at least one discharge component to be compressed against the first component when the first component is received by the at least one discharge component.

9. The system of claim 8, wherein the desired voltage potential is a ground potential of the second component.

10. The system of claim 8, further comprising:
    the working surface that electrically connects the at least one discharge component to the at least one mounting component.

11. The system of claim 10, wherein the at least one mounting component is adapted to mount the working surface to the second component.

12. The system of claim 8, wherein the at least one mounting component is selected from a group consisting of an electrically conductive screw, an electrically conductive bolt, an electrically conductive peg, an electrically conductive dowel, an electrically conductive connector ground pin, and electrically conductive tape.

13. The system of claim 8, wherein the at least one discharge component is selected from a group consisting of a fabric-covered foam gasket, a fabric-covered electromagnetic compatibility spring and a fabric-covered grounding clip.

14. The system of claim 8, wherein the first component is a memory component, and
    the second component is a computer server.

15. A method for using a stored energy discharge apparatus for discharging a first component prior to being installed into a second component, the method comprising:
    providing the stored energy discharge apparatus,
    wherein the stored energy discharge apparatus includes:

at least one mounting component adapted to a desired voltage potential used in the second component;

at least one discharge component adapted to receive the first component and discharge electrical charge from the first component to the second component through the at least one mounting component prior to the first component being installed in the second component; and at least one bracing component adapted to attach and electrically connect the at least one discharge component to a working surface, wherein the at least one bracing component is adapted to allow the at least one discharge component to be compressed against the first component when the first component is received by the at least one discharge component;

electrically connecting the stored energy discharge apparatus to a desired voltage potential used in the second component;

providing the first component; and contacting the first component with the stored energy discharge apparatus and discharging electrical charge from the first component.

16. The method of claim 15, further comprising:

mounting the stored energy discharge apparatus to the second component.

17. The method of claim 15, wherein after contacting the first component with the at least one discharge component and discharging the electrical charge from the first component, further comprising:

installing the first component at a final location in the second component.

* * * * *